United States Patent
Coward et al.

(10) Patent No.: US 7,477,892 B2
(45) Date of Patent: Jan. 13, 2009

(54) SYSTEM AND METHOD FOR ADVANCED SERVICE INTERACTION

(75) Inventors: Daniel R. Coward, San Francisco, CA (US); Annette M. Wagner, Los Altos, CA (US); Aaron Cooley, San Francisco, CA (US); Tom Seago, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 603 days.

(21) Appl. No.: 10/808,761

(22) Filed: Mar. 24, 2004

(65) Prior Publication Data
US 2004/0198331 A1 Oct. 7, 2004

Related U.S. Application Data

(60) Provisional application No. 60/460,041, filed on Apr. 2, 2003.

(51) Int. Cl.
*H04M 3/42* (2006.01)
*H04B 1/38* (2006.01)
(52) U.S. Cl. .................................... 455/414.1; 455/566
(58) Field of Classification Search ................. 455/403, 455/414.1–414.3, 432.3, 456.1, 456.3, 413, 455/566; 705/26, 1; 707/1; 715/700; 709/203; 379/201.01, 201.04, 207.02, 207.03, 207.12; 725/34, 46; 345/173
See application file for complete search history.

(56) References Cited

U.S. PATENT DOCUMENTS

| | | | |
|---|---|---|---|
| 5,365,360 A | 11/1994 | Torres | |
| 6,084,951 A | 7/2000 | Smith et al. | |
| 6,091,956 A | 7/2000 | Hollenberg | |
| 6,249,815 B1 * | 6/2001 | Foladare et al. | ............. 709/223 |
| 6,282,435 B1 | 8/2001 | Wagner et al. | |

(Continued)

FOREIGN PATENT DOCUMENTS

EP 0 888 025 A2 12/1998

(Continued)

*Primary Examiner*—George Eng
*Assistant Examiner*—Nam Huynh
(74) *Attorney, Agent, or Firm*—Martine Penilla & Gencarella, LLP

(57) ABSTRACT

An invention is provided for advanced service interaction for a mobile device. The system includes a user information system that stores user profile information based on a particular user, and a service information system that stores service description data describing a plurality of services available to the user. Also included in a ranker filter module that predicts a set of services from the plurality of services that the user is expected to utilize within a predefined period of time. The prediction is based on the user profile information stored in the user information system, such as user specific usage patterns (e.g. derived from past usage patterns). The system further includes a renderer that generates a display of the set of services on the mobile device using a ranking system. For example, the renderer can display services of the set of services in primary, secondary, and tertiary positions on the mobile device display. The system can include a service aggregator that combines at least two services into a linked aggregated service using the service description data. The linked aggregated service provides information from both services to the user in a pooled form.

15 Claims, 6 Drawing Sheets

U.S. PATENT DOCUMENTS

| | | | |
|---|---|---|---|
| 6,342,894 B1 | 1/2002 | Nojiri | |
| 6,501,956 B1 | 12/2002 | Weeren et al. | |
| 6,668,177 B2 | 12/2003 | Salmimaa et al. | |
| 7,047,041 B2 | 5/2006 | Vanska et al. | |
| 2002/0111172 A1 | 8/2002 | DeWolf et al. | 455/456 |
| 2002/0133545 A1* | 9/2002 | Fano et al. | 709/203 |
| 2002/0187775 A1* | 12/2002 | Corrigan et al. | 455/414 |
| 2003/0013483 A1 | 1/2003 | Ausems et al. | |
| 2003/0187984 A1* | 10/2003 | Banavar et al. | 709/225 |
| 2004/0043758 A1* | 3/2004 | Sorvari et al. | 455/414.1 |
| 2004/0075675 A1* | 4/2004 | Raivisto et al. | 345/700 |
| 2004/0225654 A1* | 11/2004 | Banavar et al. | 707/6 |
| 2005/0060365 A1* | 3/2005 | Robinson et al. | 709/203 |
| 2005/0204030 A1 | 9/2005 | Koch et al. | |

FOREIGN PATENT DOCUMENTS

| | | |
|---|---|---|
| EP | GB 2 346 716 A | 8/2000 |

* cited by examiner

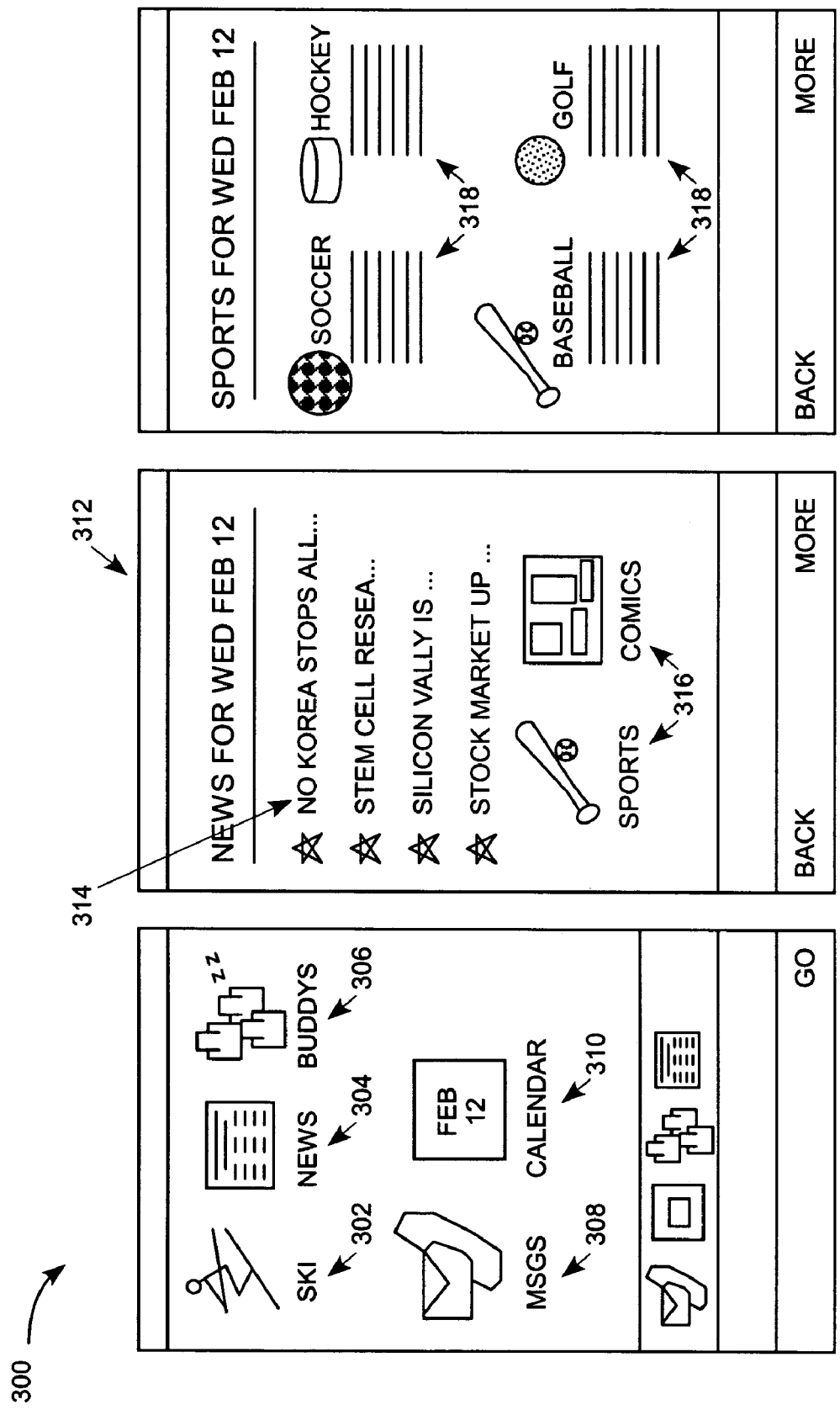

SYSTEM AND METHOD FOR ADVANCED SERVICE INTERACTION

CROSS REFERENCE TO RELATED APPLICATIONS

This application claims priority to U.S. Provisional Patent Application No. 60/460,041, entitled "System and Method for Advanced Service Interaction," filed Apr. 2, 2003, which is incorporated herein by reference. This application is also related to U.S. patent application Ser. No. 10/808,824 (SUNMP325), filed on the same date as the instant application, and is incorporated herein by reference.

BACKGROUND OF THE INVENTION

1. Field of the Invention

This invention relates generally to mobile devices, and more particularly to software, information systems for provisioning mobile devices, and advanced service interaction on mobile devices.

2. Description of the Related Art

Although, cellular telephone systems have traditionally been utilized to provide voice data communication, additional data services, such as Internet access and scheduling, are being made increasingly available to mobile device subscribers. For example, FIG. 1 is a block diagram of an exemplary cellular telephone system 100. The cellular telephone system 100 includes a mobile device 102, such as a cellular phone, which is in communication with a carrier network 104. The carrier network 104 supplies the network and other elements to enable the mobile device 102 to interact with the internal services 106 and external services 108 available via the carrier system 104.

For example, the carrier network 104 typically can include a number of fixed base station transceivers, which mobile devices 102 communicate with via radio channels. However, the number of radio channels that the operator is permitted to use is limited, and there generally is not enough for each mobile device 102 in the network to be carried on a different channel. Thus, the carrier network 104 reuses channels, that is, at any time many base stations may be transceiving on each channel. The coverage area of each radio base station is often referred to as a "cell."

As mentioned above, in addition to voice services, data services are being made increasingly available to mobile device subscribers. Thus, in addition to voice data services, such as voice mail, telephone call back, and three way calling, carrier networks 104 are beginning to provide additional electronic data to users in various ways. Exemplary data services can include calendaring facilities, book buying services, Internet browsing, and text messaging. As mobile devices 102 become more sophisticated, the mobile devices 102 can execute software applications, which can be front ends for data services.

As illustrated in FIG. 1, the carrier network 104 may provide internal services 106, which are data services provided directly from the carrier network 104. For example, internal services can include calendaring facilities, instant messaging, and other services that the carrier network 104 provider is capable of providing to subscribers. To provide additional data services, the carrier network 104 can partner with third party providers of external services 108. Each external service 108 actually runs the service, and the carrier network 104 facilitates usage of the service to its subscribers by provisioning the service throughout the carrier network 104. In this manner, subscribers can interact with the external services 108 using their mobile devices 102, such as their cellular telephones.

Often Carrier Networks 104 are proficient at providing particular classes of data services, such as scheduling and instant messaging. For other services, the carrier network 104 relies on the external service providers 108. These external service providers 108 generally provide services to the carrier network 104, which can charge subscribers more for the services. The carrier network provider 104 is then charged, in turn, by the external service providers 108. These external services then appear as part of the carrier network services to the subscriber.

Unfortunately, full utilization of data services has not occurred, most notably because of the difficulty many users experience in using data services on a mobile device and a lack of data service management capabilities of carrier networks. For example, many high end cellular phones include an Internet browser. However, the startup time for the browser often is long. In addition, from the point of view of the user, the user is required to do a very technical operation in starting up the browser, going to a bookmark or remembering a URL, and typing all the required information into the phone. If the user is lucky, a text messaging service may be available through their carrier network. However, to use such a service, the user generally is required to close down the browser, navigate the various menus to find the messaging icon, and select the icon to begin the text messaging service. In addition, multiple external services often are difficult for a carrier network service. That is, carrier networks often experience difficulties in managing the various service relationships between services provided by the external service providers. Hence, aggregating the services that user will ultimately see on their mobile device is difficult for carrier networks to manage.

Thus, a major inhibitor to data service utilization is the lack of a seamless, intuitive, uniform, easy user experience with data service usage on the mobile device. That is, a user is required to have a relatively in depth technical knowledge of the phone and carrier capabilities to utilize the data services. For example, to utilize an external book purchasing service, the user is required to know that they must startup the Internet browser, select the appropriate URL, and navigate to the appropriate purchase section of the related web site.

In view of the foregoing, there is a need for techniques that provide a seamless, intuitive, easy user experience with data services on mobile devices. The techniques should not require in depth technical knowledge on the part of the user. In addition, the techniques should facilitate service aggregation and management for carrier network providers.

SUMMARY OF THE INVENTION

Broadly speaking, embodiments of the present invention address these needs by providing systems and methods that integrate systems and software to manage and integrate a plurality of data services to users of mobile devices. In this manner, embodiments of the present invention provide a seamless, intuitive, and easy user experience with data services on mobile devices. In one embodiment, a method is disclosed for providing advanced service interaction for a mobile device. The method includes obtaining user profile information based on a user, and obtaining service description data describing a plurality of services available to the user. The method continues by predicting a set of services from the plurality of services that the user is expected to utilize within a predefined period of time based on the obtained user profile information. Thereafter, the set of services are displayed on the mobile device. In one aspect, the user profile information can include user usage pattern information describing service usage patterns of the user, and specific user personal information. In addition, services of the set of services can be displayed in primary, secondary, and tertiary positions on the mobile device display. In this case, the primary positions are the most predominate in the mobile device display, and the tertiary positions are the least predominate in the mobile device display.

The primary, secondary, tertiary thing is an example of how using the usage data and profile information and content information (time, location) can be ranked and ordered in terms of importance to the user. There may be other schemes like one with 4 or 5 or 2 levels. The concept is that there is such a scheme and that the invention provides the ranking and ordering. Thus, the three levels in this case are specific illustrations of the inventive concept.

A system for providing advanced service interaction for a mobile device is disclosed in an additional embodiment of the present invention. The system includes a user information system that stores user profile information based on a particular user, and a service information system that stores service description data describing a plurality of services available to the user. Also included is a ranker filter module that predicts a set of services from the plurality of services that the user is expected to utilize within a predefined period of time. The prediction is based on the user profile information stored in the user information system. The system further includes a renderer that generates a display of the set of services on the mobile device. The renderer can display services of the set of services in primary, secondary, and tertiary positions on the mobile device display. As above, the primary positions are the most predominate in the mobile device display and the tertiary positions are the least predominate in the mobile device display. In one aspect, the service description data can define how each service can be presented to a user, and can further define how each service can be aggregated with another service. In this case, the system can include a service aggregator that combines at least two services into a linked aggregated service using the service description data. The linked aggregated service provides information from both services to the user in a pooled form. The system can also include a user action proxy that detects user actions and stores the user actions in the user information system, and a front end system in communication with the renderer and provides an entry into the system.

A computer program embodied on a computer readable medium for providing advanced service interaction for a mobile device is disclosed in a further embodiment of the present invention. The computer program includes program instructions that obtain user profile information based on a user, and program instructions that obtain service description data describing a plurality of services available to the user. Further, program instructions are included that predict a set of services from the plurality of services that the user is expected to utilize within a predefined period of time based on the obtained user profile information. The computer program also includes program instructions that display the set of services on the mobile device. Similar to above, the user profile information can include user usage pattern information describing service usage patterns of the user, and specific user personal information. Also as above, services of the set of services can be displayed in primary, secondary, and tertiary positions on the mobile device display. Again, the primary positions are the most predominate in the mobile device display and the tertiary positions are the least predominate in the mobile device display. Another example of the use of the primary position is that the carrier can use this for service promotions. For instance, it might put the "American Idol" (current popular television show) voting service in primary position because it shows on Tuesday night and the show is on-the-air, even though the user has not yet subscribed to it. In one embodiment, user context (can include time, where they are in the world, whether their phone is active or silent and other aspects.)

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which:

FIG. 3A illustrates an exemplary home page mobile device display for services managed via service management software, in accordance with an embodiment of the present invention;

FIG. 3B illustrates an exemplary news data service display, in accordance with an embodiment of the present invention;

FIG. 3C illustrates an exemplary sports section of a news data service, in accordance with an embodiment of the present invention;

DETAILED DESCRIPTION OF THE PREFERRED EMBODIMENTS

An invention is disclosed for advance service interaction in a mobile device environment. Embodiments of the present invention integrate systems and software to manage and integrate a plurality of data services to users of mobile devices. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
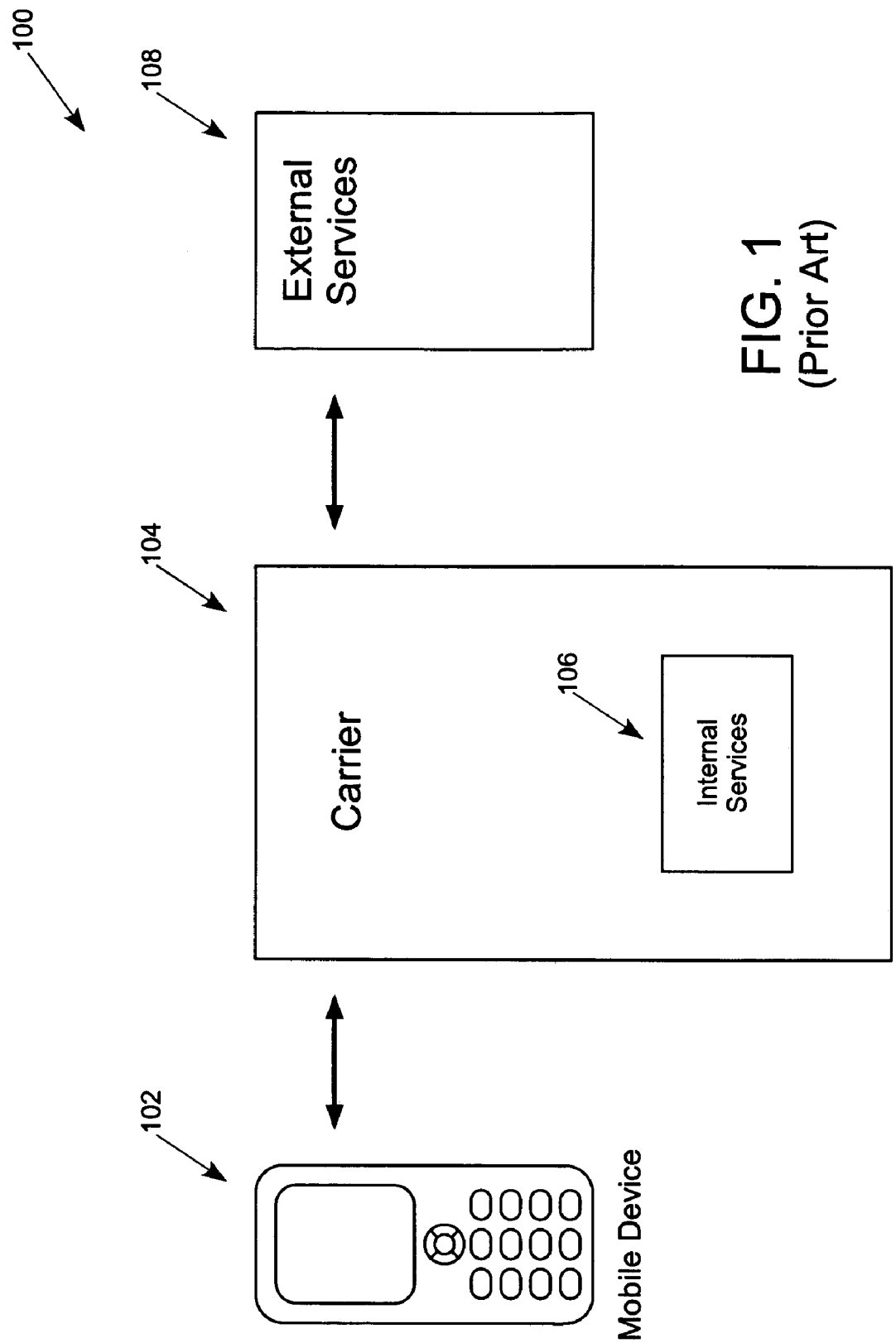
FIG. 1 is a block diagram of an exemplary cellular telephone system.
Figure 2:
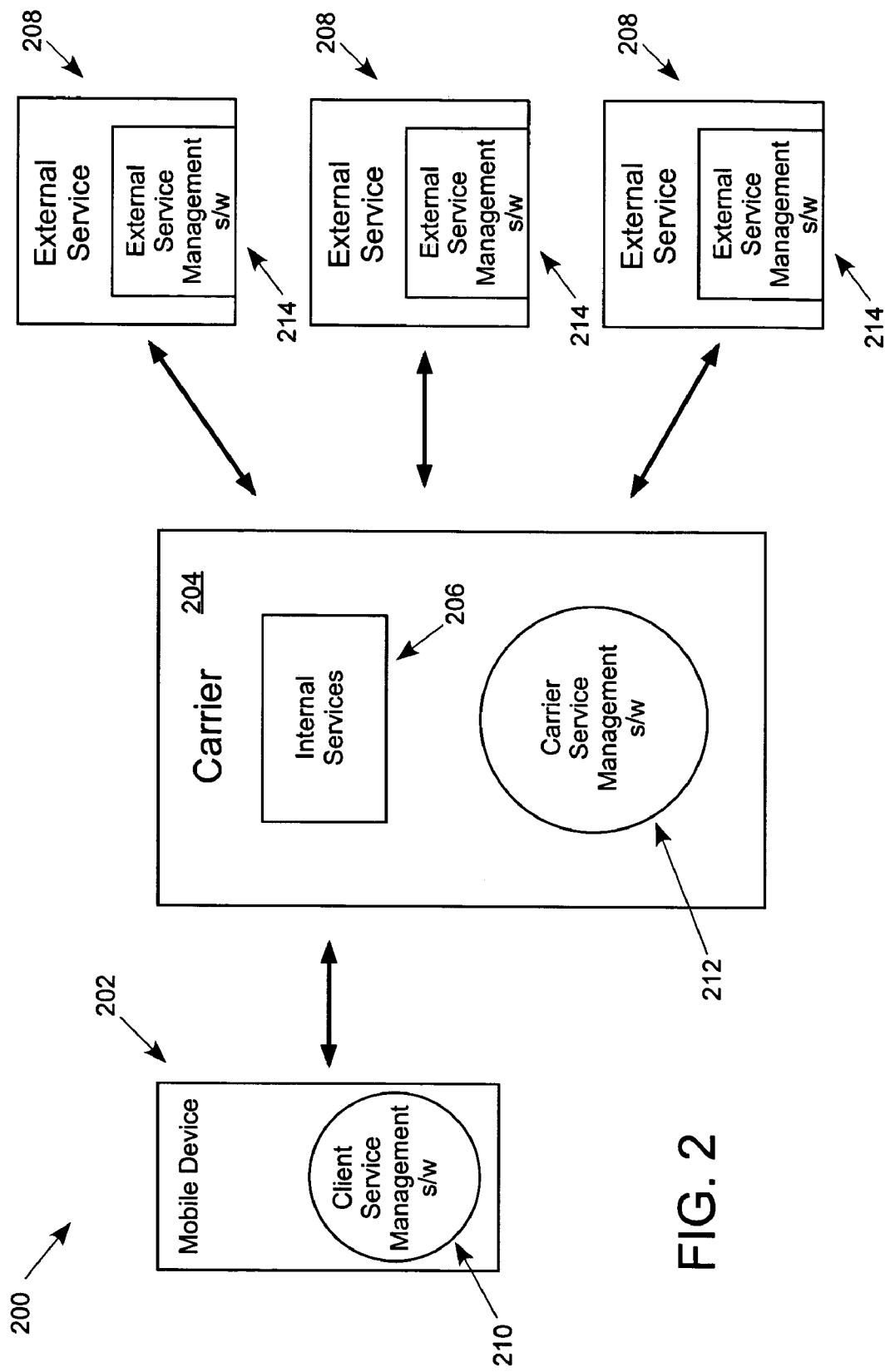
FIG. 2 is a block diagram showing a cellular telephone system having advanced service interaction, in accordance with an embodiment of the present invention.

FIG. 1 was described in terms of the prior art. FIG. 2 is a block diagram showing a cellular telephone system 200 having advanced service interaction, in accordance with an embodiment of the present invention. The cellular telephone system 200 includes a mobile device 202, such as a cellular phone, which is in communication with a carrier network provider 204. The carrier network provider 204 supplies the network and other elements to enable the mobile device 202 to interact with the internal services 206 and external services 208 available via the carrier network provider 204.

For example, as described above, the carrier network provider 204 typically can include a number of fixed base station transceivers, with which mobile devices 202 communicate via radio channels. However, the number of radio channels that the operator is permitted to use is limited, and there generally is not enough for each mobile device 202 in the network to be carried on a different channel. Thus, the carrier network 204 reuses channels, that is, at any time many base stations may be transceiving on each channel. The coverage area of each radio base station is often referred to as a "cell."

Embodiments of the present invention manage and integrate services using service management software spread across the components of the system 200. In one embodiment, the service management software includes client service management software 210 installed on the mobile devices 202 of the system, and carrier service management software 212 located within the carrier network 204. In addition, the service management software can include external service management software 214, which is located at the external service providers 208. Although FIG. 2 illustrates the service management software allocated between the mobile devices 202, carrier network 204, and external services 208, it should be noted that the embodiments of the present invention can be embodied on any one or two elements of the system 200.

The service management software of the embodiments of the present invention provides a seamless, intuitive, and easy user experience with data services on mobile devices 202. As will be explained in greater detail below, embodiments of the present invention provide data services and data service aggregation to users based on user specific information. Broadly speaking, the carrier provider 204 stores profile information regarding individual subscribers. In addition the carrier provider stores information regarding each individual subscriber's service usage patterns, such as, what services the individual uses, when they use each service, and how often each service is utilized. Based on the above user information and stored descriptions of the data services available on the system 202, embodiments of the present invention display data services to subscribers in a manner that the subscriber is most likely to utilize the data services. Furthermore, as will be described in greater detail below, embodiments of the present invention aggregate available data services to further enhance the users experience, as illustrated next with reference to FIGS. 3A-3F.

Figure 3E:
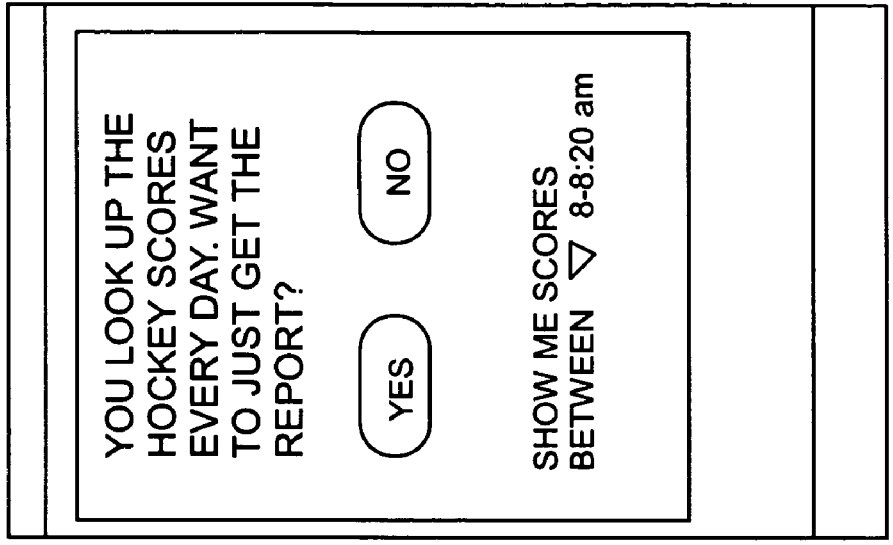
FIG. 3E illustrates an exemplary query display for a hockey data service, in accordance with an embodiment of the present invention.

FIGS. 3A-3F illustrate usage pattern recognition for an exemplary subscriber who, for example, has viewed hockey reports at 7:30 a.m. for the last two days. FIG. 3A illustrates an exemplary home page mobile device display 300 for services managed via service management software, in accordance with an embodiment of the present invention. In the example of FIG. 3A, five data services are displayed based on the usage patterns of the particular subscriber owning the mobile device. In addition, it should be noted that the displayed data services can also be based on the user's network context, such as for example the user's physical location and the current phone mode (ring or silenced).

For example in FIG. 3A, the mobile device displays a ski service 302, a news service 304, a buddies service 306, a messaging service 308, and a calendaring service 310. As described in greater detail below, embodiments of the present invention store user profile information for individual subscribers. The data services 302-310 displayed in FIG. 3A are based on the user profile information of the subscriber owning the particular mobile device.

In the example of FIG. 3A the user decides to view the news by selecting the news data service 304. In response, the mobile device displays a news data screen illustrated in FIG. 3B. FIG. 3B illustrates an exemplary news data service display. The news service data displayed shows, for example, a date display 312, current headlines 314, and a plurality of news sections 316. Continuing with the above example, the user selects the sports section 316. In response, the mobile device displays the sports section of the news data service as illustrated in FIG. 3C.

Figure 3D:
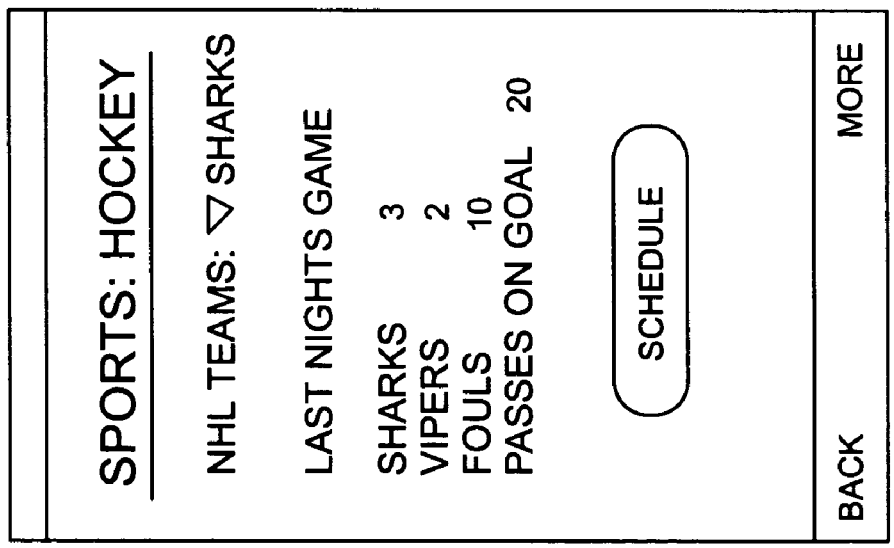
FIG. 3D illustrates exemplary game scores for an exemplary user's favorite hockey team, in accordance with an embodiment of the present invention.

FIG. 3C illustrates an exemplary sports section of a news data service in accordance with an embodiment of the present invention. For example, FIG. 3C illustrates a plurality of sports reports 318. Each sports report 318 provides information on a particular sport, such as, soccer, hockey, baseball, and golf. Continuing with the above example the user selects the hockey report 318 to obtain, for example, the recent hockey scores of their favorite team. As illustrated in FIG. 3D the game score for the user's favorite team is displayed for the user.

Figure 3F:
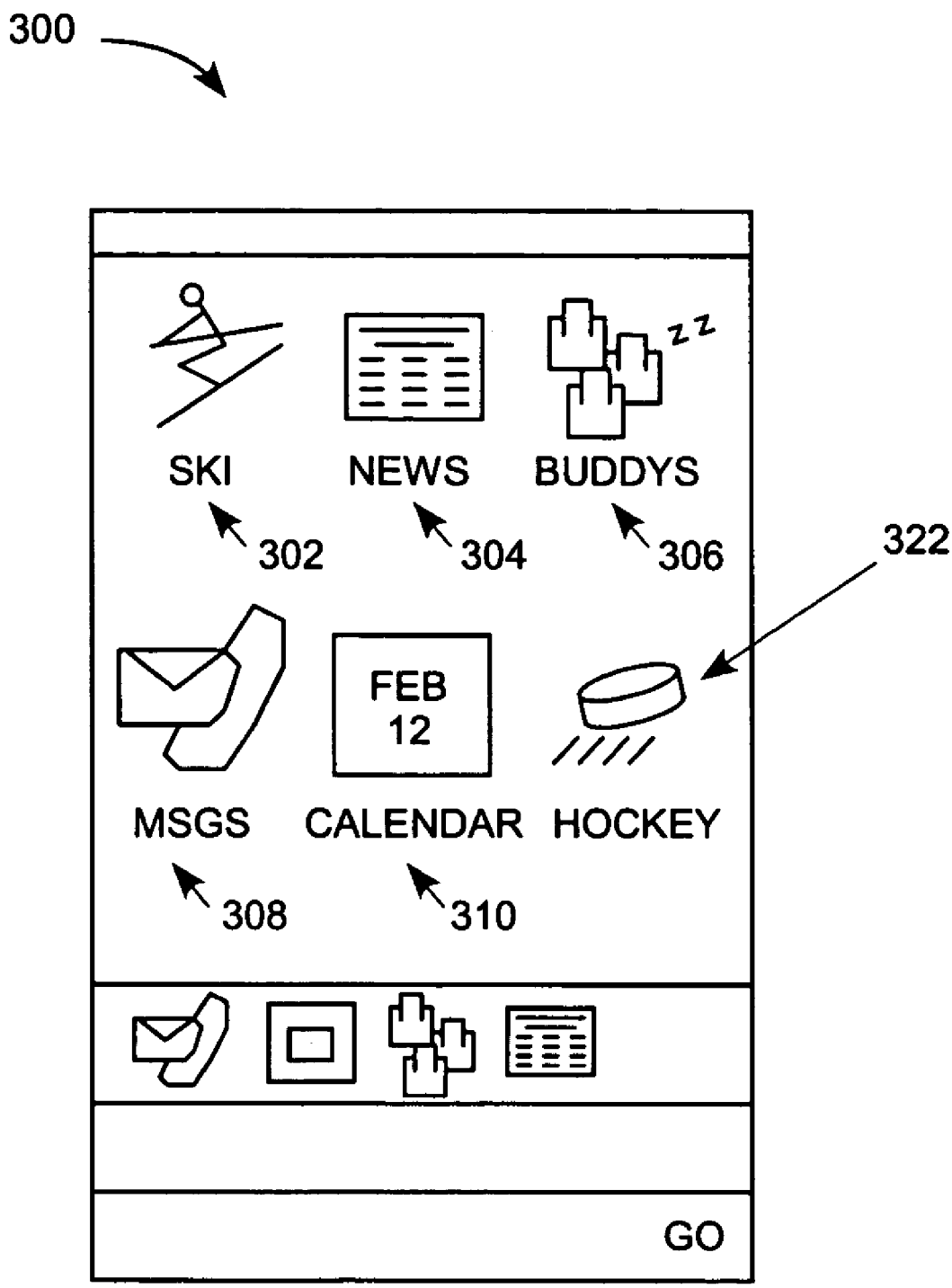
FIG. 3F illustrates an exemplary hockey icon added to a user's home page, in accordance with an embodiment of the present invention.

At this point the service management software of the embodiments of the present invention detects that this particular subscriber has viewed the hockey sports report 318 at about the same time three days in a row. The service management software detects this as a usage pattern that suggests a particular service. In response, the service management software displays a query display 320 as illustrated in FIG. 3E. FIG. 3E illustrates an exemplary query display 320 for a hockey report service in accordance with an embodiment of the present invention. The query display 320 queries the user as to whether the user would like to see the hockey report everyday at 7:30 a.m. Preferably, the query display 320 is displayed as if it were part of the hockey news service. That is, the query display 320 preferably appears to the user as a natural extension of what they were already doing, in this case, viewing the hockey news. Continuing with the above example the user confirms that they would like to view the hockey reports 318 on a daily basis. In response a hockey icon 322 is added to the user's home page mobile device display 300, as illustrated in FIG. 3F.

Figure 4:
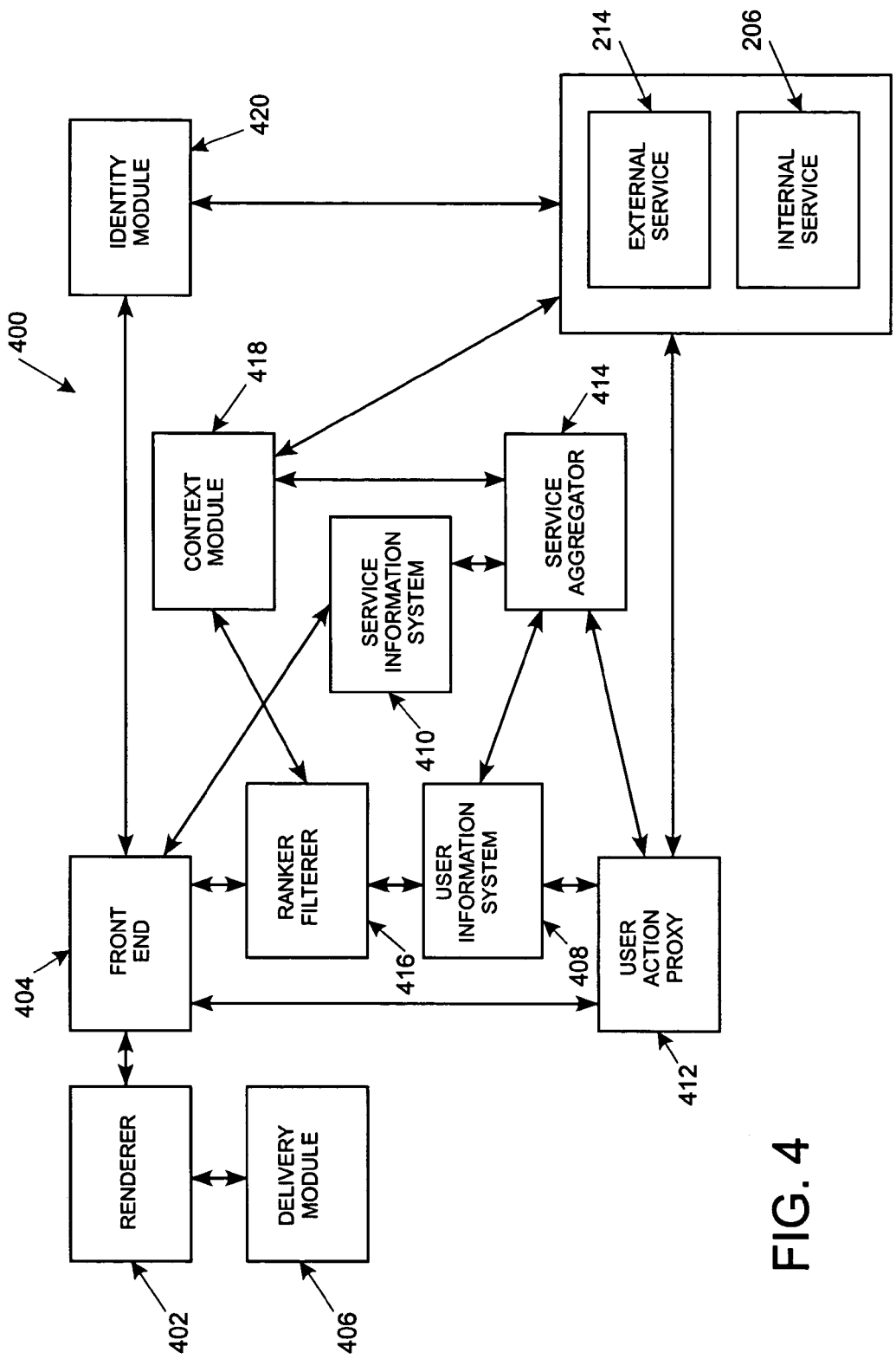
FIG. 4 is a block diagram showing exemplary functional blocks comprising service management software, in accordance with an embodiment of the present invention.

FIG. 4 is a block diagram showing exemplary functional blocks comprising service management software 400, in accordance with an embodiment of the present invention. As described above, the service management software 400 can be spread across the components of a carrier network system. In one embodiment, the service management software includes client service management software installed on the mobile devices of the system, carrier service management software located within the carrier network, and external service management software located at the external service providers. However, as mentioned previously, the service management software can be embodied on any one or two elements of the system.

Broadly speaking, the service management software 400 encompasses a plurality of functional elements including a renderer 402, front end 404, delivery module 406, user information system 408, service information system 410, user action proxy 412, service aggregator 414, ranker filterer 416, and context module 418. Utilizing these functional elements, the service management software 400 of the embodiments of the present invention provides a seamless, intuitive, and easy user experience with data services on mobile devices.

As shown in FIG. 4, the renderer 402 interprets a service management grammar and uses that information to generate a user interface display, which the user uses to interact with the mobile device. The service management grammar is an information format that encapsulates an abstract representation of any mobile device supporting the user interface semantics of the embodiments of the present invention. In particular, the service management grammar includes the information necessary to render device displays, which can display individual services in a plurality of different ways. For example, the service management grammar allows services to be displayed in summarized form, such as an icon. In one embodiment, the summarized form reflects the active state of the service, that is, whether the service is quiescent, active, needs attention, or has summarized information to display. In addition, service management grammar allows services to be displayed in detailed form, for example, when the service is actively displaying and gathering information to and from the user. It should be noted that information can be displayed in many different detailed forms, such as scrolling, using the entire screen display, or hidden while still running in the background.

The renderer 402 can be embodied as part of the client service management software, the carrier service management software, or both, depending on the needs and desires of the actual system designer. Any information represented on the screen that the user interacts with is rendered using the renderer 402. Also, the renderer 402 translates any information sent from the mobile device to a server in the carrier network into the service management grammar. The renderer 402 is in communication with a front end 404 and a delivery module 406.

The front end 404 communicates with backend service management software components in order to generate service management grammar on demand. For example, when a mobile device is turned on, the mobile device may display a particular page of information to the user. In order to display the page, the mobile device requests the page from the front end 404.

As used herein, "page" is actually a Java user interface containing information. The information is held in the service grammar. In other embodiments, a browser may be able to display web pages with this functionality. In still another embodiment, a client framework (native or Java) can consume the service data from the server and update its display accordingly. Accordingly, "page" should be read broadly, and can include a page Home screen, a Services display, a Homebase, a Phonetop, etc.

Depending on the context of the request, the front end 404 queries appropriate service management software components for the data required to create the requested page. The front end 404 then responds to the mobile device request with service management grammar for the page. The renderer 402 then interprets the service management grammar into the page of information that the user sees on the mobile device.

The renderer 402 also communicates with a delivery module 406 to obtain information needed to generate a display for the user. The delivery module 406 manages the delivery of large portions of binary data, such as large image files, MPEG files, and pieces of executable code. Thus, renderer 402 utilizes both the front end 404 and the delivery module 406 to obtain information needed to generate a display for the user. For example, to display a movie viewing service, the front end 404 may provide the service management grammar for a movie selection page to the renderer 402, which interprets the service management grammar to generate the movie selection page. When the user selects a movie to watch, the renderer 402 may contact the delivery module 406 to obtain the actual movie viewing software and movie files.

As mentioned above, the carrier network provider provides internal services 206 and the external service providers provide external services 214. Generally these services are represented by an icon on the display of the mobile device. However, not all services need to have an icon representation. For example, a telephone call is an example of a service that does not require icon representation. As mentioned above, internal services 206 can include, for example, calendaring facilities, instant messaging, and other services that the carrier network provider is capable of providing to subscribers. External services 214 can include, for example, sports news, ski reports, movie services, mapping services, and other services that execute on servers of external service providers, which the carrier network provisions throughout the carrier network to facilitate usage of the service to subscribers.

Two information systems are utilized by the embodiments of the present invention, namely, the user information system 408 and the service information system 410. The service information system 410 is an information storage that lists all the services, both internal and external, that are available through the carrier network. The service information system 410 can be embodied in a database, a directory server, a file system, or any other type of system capable of storing and retrieving data on the services available via the carrier network and external service providers. Together with the above described list of services, the service information system 410 stores descriptions of each listed service, which provides information useful to the system for facilitating display and provisioning of the service. For example, a service description can include information on how a particular service should be rendered, such as, should the service be displayed as an icon, a scrolling message, or using the entire screen. In addition, the description of a service describes how the service can be utilized with another service. Further, the description of a service can describe how the service fits with the carrier's business model. For example, a description may indicate a particular service is targeted at 18-25 year old males, or the service should be promoted to current premium members.

Embodiments of the present invention allow services to be aggregated. For example, a movie service that list movie times and location can be aggregated with a location service that provides GPS location information and driving directions. In this example, the location service can be utilized to determine where the subscriber is currently located, and then list movies times for theaters are a particular distance from the subscriber's current location, for example, within ten miles of the subscriber. To perform service aggregation, the description of the movie service includes information indicating that the movie service can be utilized in combination with location information, and the location service description can include information indicating that the location service can expose location information to other services.

A service description can further include information on how the service operates with carrier network functions. Carrier network providers often want users to subscribe to additional services that are available via the carrier network. Consequently, carrier network providers often want users to be able to easily subscribe to these additional services. Thus, service descriptions can include information regarding when and in what situations the particular service is useful to subscribers. In this manner, the carrier network can inform users about the service when the described situations occur.

The user information system 408 stores profile information regarding individual subscribers, such as, an individuals billing packages, age, credit card number, address, and other user information. In addition, the user information system 408 stores information regarding the individual's service usage patterns, such as, what services the individual uses, when they use each service, and how often each service is utilized. For example, for a particular user, the user information system 408 can store information such as the fact that the user turned on their mobile device at 7:00 a.m. and immediately utilized a news service for 5 minutes.

The service management software 400 also includes a user action proxy 412, which tracks the activities of all the subscribers that are online. For example, when a subscriber utilizes a news service, the user action proxy 412 detects the subscriber's usage of the news service. Hence, the user action proxy 412 knows what each user is doing online at any particular time. It also knows the current state for each service subscribed to by a particular user. For example, if a user has two messages in their inbox of their email service, the user action proxy 412 knows the email service is in an active state because the messages have yet to be read. Other examples include calendaring services, where if the user is not using the calendaring service and no appointments are set, the user action proxy 412 knows the service is currently inactive. The user action proxy 412 stores the tracked user activities in the user information system 408.

In addition, the user action proxy 412 can interpret a combination of service activities to mean a particular event. That is, the user action proxy 412 monitors the services of each user and notices particular patterns that may occur within the services. When such patterns are detected, the user action proxy 412 can notify the user that the user should potentially take action regarding the pattern. For example, a user may have a note in their "to-do" list on their calendaring service that says "Call Bob." In addition, the user may have an appointment with Bob at 3:00 p.m. stored in the user's calendar. Then, for example, Bob may call the user and leave a voice mail for the user. In this example, the user action proxy 412 will notice that Bob is a common theme within the services, and as such, may send the user an alert indicating something important may be occurring regarding Bob.

Using the service descriptors or the service information system 410, the service aggregator 414 combines individual services into linked and aggregated services. As mentioned above, the service information system 410 includes service descriptors describing how services can be utilized together. The service aggregator 414 dynamically links these services together based on the service descriptions. Continuing the movie and location service example, the movie service will have a service descriptor and the location service will have a service descriptor stored in the service information system 410. The service aggregator 414 examines the service descriptor of the movies service and the service descriptor of the location service and determines that the two services can be utilized together. In addition, the service aggregator 414 can examine the user information system 408 to determine whether the user might be interested in an aggregated movie and location service.

The ranker filterer 416 ranks services for display to the user based on the anticipated needs of the user. More particularly, the ranker filterer 416 uses extensive historical usage data stored in the user information system 408 is aggregated with contextual information regarding the user, such as the user's geographical location, and business model specific attributes attached to individual services, for example demographic information about the suitability of a service for offer to the user, to rank services. That is, the ranker filterer 416 applies rules and algorithms to the above data to determine which services should be displayed in primary, secondary, and tertiary positions on the screen of a particular user's mobile device. A Service displayed in the primary position is a service that the ranker filterer 416 determines is most likely to be the next service the user will utilize. Services displayed in the secondary position, which in one embodiment are displayed around the service displayed in the primary position, are services that are likely to be utilized, but as likely as the service displayed in the primary position. The remaining services available to the user are displayed in the tertiary position. Alternatively, a list of all services instead of a tertiary position can be provided.

Again, the primary, secondary, tertiary thing is an example of how using the usage data and profile information and content information (time, location) can be ranked and ordered in terms of importance to the user. There may be other schemes like one with 4 or 5 or 2 levels. The concept is that there is such a scheme and that the invention provides the ranking and ordering. Thus, the three levels in this case are specific illustrations of the inventive concept.

In addition, the ranker filterer 416 determines whether a service should spontaneously appear on the screen, and whether a service should be configured to be active or passive. Further information on service ranking can be found in U.S. Provisional Patent Application No. 60/460,052, entitled "Context Based Main Screen for Mobile Device," filed Apr. 2, 2003, which is incorporated herein by reference.

The context module 418 keeps track of different aspects of the users current context. For example, one aspect is the user's network presence, such as whether the user is online or offline, has just lost a signal, been online since 5:00 a.m., is making a call, has their phone ringer off, etc. In addition, the context module 418 keeps track of the users physical location, which can be, for example, the zip code of the user's current location or the user's longitude and latitude. Further, the context module 418 keeps track of the current time translated into the context the user is in, for example, using the user's current time zone, such as Pacific or Hong Kong time. The context module 418 keeps track of the above information for all the subscribers on the system. As such, the carrier network provider can utilize this information to allow subscribers to keep track of where other subscribers such as their friends are located, generally utilizing proper security features facilitated by the identity module 420.

The identity module 420 manages user authentication into the network. When the user switches their mobile device on, the mobile device authenticates with the network. In order for the other functional modules in the system to securely perform the highly personalized functions described thus far, the modules need to know a particular network connection entering the system is authenticated as an appropriate user. For example, the modules need to know that a particular packet of data is coming from a specific user, so that specific user's user information should be utilized to allow that user to interact with the network.

In addition, the identity module 420 performs translations for different types of identity information. Carrier networks utilize various types of identity information. The highest level of identity information is that of an individual user, which includes the user's billing and personalization information. The lowest level of identity information is the MSI serial number on the user's mobile device. When a mobile device connects to a carrier network, the mobile device is assigned an MSI serial number that represents that mobile device on the network. The identity module 420 is capable of translating between specific MSI serial numbers and the corresponding user information, which the MSI serial number represents.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for providing advanced service interaction for a mobile device, comprising:
    a user action proxy to,
        a) detect user actions,
        b) store information associated with user actions in a user information;
        c) monitor each service subscribed to by a user, the monitoring further includes detection of a pattern common to at least two services by interpreting a combination of at least two service activities to mean a particular event,
        d) generate a user alert when a pattern is detected;
    a user information system storing user profile information and the user action information based on a particular user;
    a service information system storing service description data describing a plurality of services available to the user;
    a service aggregator that examines service description data associated with at least two services available to the mobile device to determine if the at least two services can be combined and dynamically combining the at least two services into a linked aggregated service using the service description data associated with each of the at least two services upon successful determination, the link aggregated service providing information from each of the linked services to the user in a pooled form;
    a ranker filter module that predicts a set of services from the plurality of services that the user is expected to utilize within a predefined period of time based on the user profile information and the user action information stored in the user information system; and
    a renderer that generates a display of the set of services on the mobile device, wherein the renderer displays services of the set of services in a primary, secondary, and tertiary positions on a mobile device display, and wherein the primary positions are most predominate in the mobile device display and the tertiary positions are least predominate in the mobile device display.

2. A system as recited in claim 1, wherein the user profile information includes user usage pattern information describing service usage patterns of the user.

3. A system as recited in claim 1, wherein the user profile information includes specific user personal information.

4. A system as recited in claim 1, wherein the service description data defines how each service can be presented to a user.

5. A system as recited in claim 1, wherein the service description data further defines how each service can be aggregated with another service.

6. A system as recited in claim 1, wherein the service aggregator further examines the user information system to determine if the user is interested in the linked aggregated service prior to dynamically combining the at least two services.

7. A system as recited in claim 1, wherein the user action proxy notifies the user of the pattern.

8. A system as recited in claim 1, further comprising a front end system in communication with the renderer, the front end system providing an entry into the system.

9. A method for creating a presentation for advanced service interaction on a mobile device, the method comprising:
    generating a home page display on the mobile device, wherein the home page display includes a set of services selected from a plurality of services, the Set of services selected from the plurality of services according to a prediction about the set of services that a user is expected to utilize within a predefined period of time based on a profile associated with the user, at least one service of the set of services being associated with a particular service, wherein the particular service is different from each service of the plurality of services, wherein services of the set of services are displayed in a primary, secondary, and tertiary positions on the home page display, and wherein the primary positions are most predominate in the home page display and the tertiary position are least predominate in the home page display;
    examining service descriptor data associated with at least two services from the set of services in the home page display to determine if the at least two services can be combined and dynamically combining the at least two services of the plurality of services into a linked aggregated service using the service description data associated with each of the at least two individual services, wherein the linked aggregated service is presented at the home cage display and provides information from each of the at least two services to the user in a pooled form;

monitoring each service from the set of services displayed on the mobile device, the monitoring further including detecting a pattern common to at least two services by interpreting a combination of at least two service activities from the set of services to mean a particular event;

generating a user alert when a pattern is detected;

accepting signals from a user input device to allow a selection of the at least one service of the set of services, wherein the selection of the at least one service of the set of services facilitates the user interacting with the particular service;

storing usage pattern information describing a usage pattern of the particular service in the profile associated with the user; and generating a query display on the mobile device, wherein the query display is generated based on the usage pattern information describing the usage pattern of the particular service, the query display prompting the user to add the particular service to the set of services, wherein a confirmation from the user facilitates including the particular service in the set of services displayed in the home page display.

10. A method as recited in claim 9, wherein the profile includes user profile information derived based on previous interactions with services.

11. A method as recited in claim 9, wherein the profile includes service usage pattern information describing service usage patterns of the user.

12. A method as recited in claim 9, wherein the profile includes specific user personal information.

13. A method as recited in claim 9, wherein service description data defines how each service of the plurality of services can be presented to a user.

14. A method as recited in claim 13, wherein the service description data further defines how each service of the plurality of services can be aggregated with another service.

15. A method as recited in claim 14, further comprising examining the profile associated with the user to determine if the user is interested in the linked aggregated service prior to dynamically combining the at least two services.

* * * * *